Dec. 2, 1958 W. E. BRADLEY 2,862,998

COLOR TELEVISION SYSTEM

Filed Sept. 14, 1951 3 Sheets-Sheet 1

INVENTOR
WILLIAM E. BRADLEY
BY Allen V. Hazeltine
ATTORNEY

COLOR TELEVISION SYSTEM

Filed Sept. 14, 1951 3 Sheets-Sheet 2

INVENTOR
WILLIAM E. BRADLEY
BY Allen V. Hazeltine
ATTORNEY

INVENTOR
WILLIAM E. BRADLEY
BY Allen V. Hazeltine
ATTORNEY

United States Patent Office 2,862,998

Patented Dec. 2, 1958

2,862,998

COLOR TELEVISION SYSTEM

William E. Bradley, New Hope, Pa., assignor to Philco Corporation, Philadelphia, Pa., a corporation of Pennsylvania Application September 14, 1951, Serial No. 246,566

7 Claims. (Cl. 178—5.2)

The present invention relates to color television systems, and more particularly to improvements in transmitters and receivers for use in the translation of color images.

Color television systems are known in the art which, under certain conditions, are operative to translate a color image from a transmitter to a remotely-located receiver, while preserving to a substantial degree the appearance of the original image. Typical of such systems are those which may require a video frequency spectrum of 12 megacycles band-width for image representation, a 4 megacycle band being employed to represent each of three color-specifying parameters, the term "color" being employed herein to indicate both the brightness and chromaticity of a light source. However, since space in the electromagnetic frequency spectrum in the region suitable for television broadcasting is presently at a premium, it appears highly desirable, if not necessary, to restrict the video frequencies utilized for image-representation to as narrow a band as is possible, and preferably to a frequency band which is not greatly in excess of 4 megacycles per second (mc.), for example.

Another highly desirable characteristic of a practical color television system is that it be compatible with the presently-existing standards for monochrome television, that is, that the signal transmitted by the color television system be such that it may be received by presently-existing monochrome receivers to produce therein an acceptable black-and-white version of the color image.

To obtain a satisfactory color image at a receiver when the spectrum available for image representation during transmission is limited to a relatively small value such as 4 mc., it becomes necessary to utilize the available spectrum space more efficiently, as by utilizing improved systems of transmission or by weighting the quantity of spectrum space allotted to the various parameters of the color-specifying signals in accordance with their relative importance in producing visual effects in the optical perceptive system of the observer, for examples.

Systems have been proposed which attempt to utilize more efficiently the available frequency spectrum, and which rely upon certain psychophysical characteristics of the human visual perceptive system for their operation. For example, there has been proposed a system in which there are derived at a transmitter three separate signals comprising frequency components situated in a relatively low frequency range, e. g. 0–2 mc., which signals are indicative of the amounts of three additive primary colors which should be optically mixed in order that the color of the contemporaneously-scanned regions of the televised image may be matched. These three signals may, for example, represent the red, green and blue components respectively of the televised scene, and may be such that, when applied to three cathode-ray tubes situated at a receiver and producing red, blue and green light respectively, optical superposition of the three component-color images thus formed will result in a low-definition reproduction of the original color image.

These three color-specifying signals, which may be termed the red, green and blue signals, are then sampled in sequence by means of relatively narrow pulses having a substantial average or D. C. component, at a rate of approximately 3.6 mc., for example. The resultant sampled signal is then limited by appropriate filter means so as to reject undesired components of frequencies higher than the upper sideband of the sampling frequency, which are produced by the inherent operation of the sampler.

In addition, such systems of the prior art may be arranged to derive at the transmitter a "mixed highs" signal which comprises a mixture of the higher frequency components of the three color signals, e. g. those components lying in the frequency band 2–4 mc. This "mixed highs" signal is added to the sampled color signals at the transmitter.

The composite signal containing the sampled color signals and the "mixed highs" signals is then transmitted to the receiver, wherein it is desampled by means of relatively narrow pulses arranged to occur at times corresponding to those at which the transmitter sampler pulses occur. In this manner, a red, a green and a blue signal are again derived in separate form and utilized to control the intensities of light from the red, green and blue cathode-ray tubes respectively, in the receiver. Each receiver cathode-ray tube is thereby supplied with intelligence approximately indicative of the corresponding color signal and with the "mixed highs" signal. The individual color signals are effective to control the color of the resultant image formed by combination of the three component-color images, with respect to picture content corresponding to video frequencies in the low-frequency range 0–2 mc. mentioned above, while the "mixed highs" signal supplies achromatic fine detail corresponding to picture content represented by frequency components in the 2–4 mc. region.

Although such systems of the prior art are operative to provide color images at the receiver which are adequate for some purposes, it has been found that, with such arrangements and under certain conditions, visually objectionable interference in the form of spurious patterns occurs in the receiver image. This interference, in general, is in addition to that which may be produced in a standard monochrome receiver under similar circumstances, and occurs as a result of the sampling operations characteristic of this type of color television system. For example, interference in the color image at the receiver may be produced by beat-frequency signals formed by heterodyning between the "mixed highs" signals and the sampling-frequency signal introduced by the receiver desampler, which beat-frequency signals may be of such low frequency as to be visually prominent.

Accordingly, it is an object of my invention to provide a color television system which is operative to translate, from a transmitter to a receiver, a satisfactory reproduction of a color image, while utilizing a relatively narrow frequency band for transmission purposes.

Another object is to provide such a system in which the translated color image is relatively free of spurious beat patterns and visually prominent interference of certain other types.

A further object is to provide a transmitter of color television signals which may be received by a color television receiver to produce therein an improved color image, while utilizing a relatively narrow frequency spectrum for transmission purposes, which transmitted signal is also such as to be susceptible of reception by a standard black-and-white television receiver of conventional form, to produce therein a satisfactory monochrome version of the colored image.

In the following, a color will be considered as being fully and uniquely defined, as to its subjective or apparent character, by its brightness and chromaticity. The chromaticity of the color may be measured by its two orthogonal coordinates on a standard bidimensional chromaticity diagram, each point of which diagram also specifies the hue and saturation of the color whose chromaticity is represented thereby. Other triplets of proper color-specifying parameters will, of course, also fully define a color, as, for example, the three numbers indicating the amounts of three primary colors required to match the color to be defined. The latter method of color-specification is employed in typical color television systems of the prior art.

My invention involves the following principles, which I have recognized and utilized. In systems of the prior art such as that described hereinbefore, in which three primary-color signals are sampled in succession by means of a series of relatively narrow pulses, and in which the three sampled signals are combined and filtered to remove frequency components associated with higher harmonics of the sampling rate, the resultant signal produced comprises the sum of a lower-frequency (D. C.) component and an amplitude-modulated sinusoidal higher-frequency component. The D. C. component of this resultant signal is proportional to the sum of the D. C. components of the individual sampled color signals, while the sinusoidal portion thereof equals the sum of the higher-frequency sinusoidal components of the individual sampled color signals. Since the D. C. components of the individual sampled signals are proportional respectively to the original color signals, the D. C. component of the final resultant signal is proportional to the sum of the original color signals. Further, since the individual color signals themselves represent the amounts of the three primary colors required to match the color of the image element being scanned, the sum of these original color signals, which is represented by the D. C. component of the final resultant signal, is representative of the total brightness of successively-scanned elements of the color image.

On the other hand, the values of the higher-frequency sinusoidal portion of the final resultant signal represent, at the times of occurrence of the afore-described sampling pulses, the amounts by which the required color signals depart from the sum of the D. C. components thereof, and hence of the differences in the relative amounts of the primary colors which must be produced at the receiver in order to provide proper color rendition in the reproduced image.

Accordingly, the low-frequency portion of the signal spectrum from the conventional color-signal sampling device which is produced by the D. C. component of the sampling pulses, contains the information as to variations in the brightnesses of successively-scanned elements of the television image. The high-frequency portion of this signal spectrum contains information as to the chromaticity of the color image. I have recognized that these brightness and chromaticity signals may be synthesized separately and independently in certain respects, and in these respects need not be limited by the inherent characteristics of the sampling processes commonly employed.

Accordingly, I employ means for deriving signals comprising components in a relatively low frequency range representative of the brightness or luminosity of the color television image. The absolute amplitude and upper-frequency limit of this brightness signal may be selected and controlled in accordance with considerations relating to optimum utilization of the transmission frequency spectrum which is available. For example, this brightness signal may comprise frequency components within a range extending from zero to an upper frequency limit $f_h$, where $f_h$ may equal 3 mc. To represent the chromaticity of the television image, I employ a subcarrier situated above the upper-frequency limit $f_h$ of the brightness signal, which subcarrier may be amplitude-modulated in predetermined different phases by appropriately-selected color signals. The chromaticity signal thus formed then comprises an amplitude-modulated sinusoid having a phase indicative of the hue of the color image, and an amplitude indicative of the saturation of the colors thereof. This chromaticity signal may be controlled and adjusted as to absolute amplitude and frequency range of the components thereof, again in accordance with considerations of maximum utilization of available transmission frequency bands.

Further in accordance with my invention, I propose to so locate the subcarrier frequency of the chromaticity signal, and to so limit the frequency range of the components of the chromaticity signal, as to situate the spectrum region occupied by the chromaticity signal components at a position adjacent the upper limit $f_h$ of the brightness signal range, with no substantial overlapping between the brightness signal range and the chromaticity signal range with regard to components of each signal which exist in substantially unattenuated form. Since the acuity of the human eye in discerning differences in chromaticity is considerably less than its acuity in discerning brightness variations, the chromaticity signal may also be limited to frequency components differing from the subcarrier frequency by relatively small amounts, such as .6 mc. for example.

The brightness and chromaticity signals formed in the manner described above are then transmitted to a color television receiver. Since the components of the brightness and chromaticity signals occupy substantially mutually-exclusive frequency bands, except, in some instances, for components of each signal which are substantially attenuated in magnitude, frequency discriminatory means at the receiver may separate the chromaticity signal components from the brightness signal components without substantial contamination of either by the other. The brightness signal may then be supplied to each of three primary-color light-producing sources to control the brightness of the combined light emission therefrom without substantially affecting the chromaticity of the resultant combined images. The separated chromaticity signal may be demodulated by means of signals having phases corresponding to those employed for modulation at the transmitter, to derive three separate signals indicative of the required departures of the primary color sources from the values producing black-and-white images. These latter color signals are then applied separately to each of the primary-color producing sources to control the hue and saturation of the reproduced image.

It will be seen that this arrangement, in which the brightness and chromaticity signals may be independently synthesized and controlled, particularly as to frequency content, permits the overcoming of certain fundamental limitations inherent in prior art systems. Thus, in those prior art systems employing conventional sampling arrangements, the low-frequency portion of the sampler output occupied a frequency range equal to that of the lower sideband of the sampling frequency, and, in order that these frequency ranges be maintained substantially mutually-exclusive so that proper image reproduction could be obtained, it was considered necessary that the sampling signal frequency be at least twice that of the highest frequency of the signal to be sampled. If both upper and lower sidebands of the sampling frequency were to be transmitted, a 6 megacycle band would therefore be required for the transmission of two megacycles of information as to each color. In order to provide further information in this frequency band, the "mixed highs" signal was added to superpose, in the 2 to 4 megacycle region, signals representative of brightness variations occurring at corresponding higher rates. When this was done, the spurious beat patterns mentioned hereinbefore were introduced due to the simultaneous application to the receiver sampler of the "mixed-highs" signals and the sampled color signals.

In the system which I propose, there is no inherent relationship between the width of the chromaticity signal frequency band and that of the lower-frequency brightness signal band. As a result, the higher frequency chromaticity signal band may be made very narrow, in proportion to its relative ineffectiveness in determining the appearance of fine picture detail, while the lower-frequency brightness signal may be provided with a substantially greater frequency bandwidth in proportion to its more prominent effect upon the eye in representation of fine picture detail. This is accomplished without requiring simultaneous occupancy of the same frequency band by the chromaticity and brightness signals, with the possible exception of components of each which are of substantially reduced magnitudes. As a result, the undesired beat patterns produced by prior art systems at the receiver, are not present to any substantial extent in the arrangement of my invention.

In one embodiment of my invention, the brightness signal may be derived by adding together component-color signals representative of the red, green and blue color components of the television image, including frequency components up to an upper frequency limit $f_h$ which may equal 3 megacycles. The chromaticity signal may be derived by supplying the individual color signals to a three-phase sampling device such as those employed in prior art systems, and by then passing the sampled color signals through frequency-selective means which delete signal components having frequencies equal to those of the original color signals, while passing substantially only the sampling frequency components and the sidebands produced thereabout by the color signals. In this arrangement, it will readily be appreciated that my invention comprises means for deleting the relatively narrow-band, low-frequency output signals of the sampler representative of brightness, and for replacing these signals with a wide-band low-frequency portion representative of the same class of intelligence as to picture brightness.

Other objects and features of my invention will become more apparent from a consideration of the following detailed description in conjunction with the accompanying drawings in which.

Figure 1:
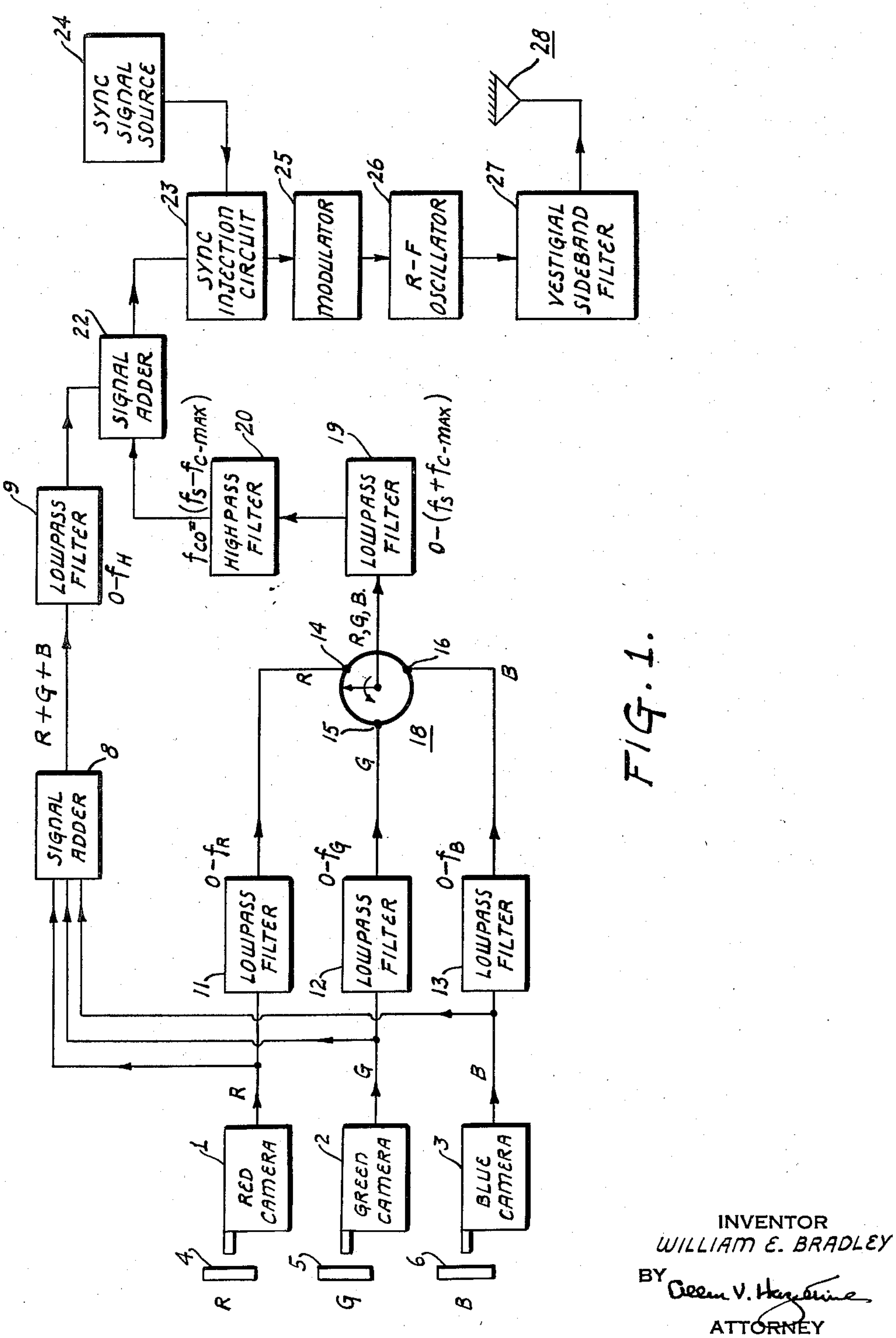
Figure 1 is a block diagram of a color television transmitter embodying my invention.

Referring now to Figure 1, there are indicated generally means for deriving three separate signals representative of three independent, color-specifying parameters of successively-scanned regions of the televised scene. In the present instance, these means comprise a "red" camera 1, a "green" camera 2 and a "blue" camera 3, which may be arranged to view the televised scene through optical filtering devices comprising red filter 4, green filter 5 and blue filter 6 respectively, red filter 4 being adapted to transmit principally light in the red region of the visible spectrum, while green filter 5 and blue filter 6 transmit principally light in the green and blue spectral regions respectively. The signal from the red camea 1, which may be termed a "red" signal, therefore represents the red component of the televised scene, while the green and blue signals from cameras 2 and 3 represent the green and blue components thereof respectively. The red, blue and green signals thus derived are preferably such that, if applied directly to three cathode-ray tubes producing red, green and blue light respectively to control the intensities thereof, then a superposition of the images formed upon the screens of these three tubes will constitute a satisfactory reproduction of the appearance of the televised scene in natural color. The color signals and the primary-color light sources to be controlled thereby are also preferably such that, when reproducing shades of black and white, the individual color signals are equal.

Although other color-specifying signals may be derived instead, by means of different camera taking-characteristics, the colormetric considerations relating to the choice of camera taking-characteristics are not pertinent to the present invention, and need not be considered here. For example, one may derive signals indicative of the components of the scene with regard to the three imaginary primaries X, Y and Z as defined by the International Commission on Illumination, in which event appropriate electrical matrixing circuits may be employed at the receiver for deriving signals suitable for controlling the real primary-color light sources employed therein. However, in the present embodiment it will be assumed that image analysis is performed with respect to real red, green and blue primaries, that the color signals produced by the cameras 1, 2 and 3 at the transmitter would produce a satisfactory color image if applied directly to three cathode-ray tubes producing light of the corresponding colors, and that it is one object of the present invention to transmit the useful intelligence contained in these color signals to a remotely-located receiver in such manner as to permit the formation therein of a color image having substantially the same appearance as that which would be obtained by direct connection to the above-mentioned cathode-ray tubes.

In accordance with the invention, the three separate color signals may be supplied to signal adder 8, which is operative to produce an output signal substantially proportional to the sum of the signals supplied thereto. Thus, adder 8 may comprise means for applying the separate color signals to a common impedance to produce the required sum signal. The signal from adder 8 therefore comprises variations which are generally indicative of corresponding variations in the brightnesses of successively-scanned elements of the televised scene.

This brightness signal is applied to low-pass filter 9 having a high frequency cut-off at frequency $f_h$, thereby limiting the content of the brightness signal to frequency components which are not substantially in excess of the frequency $f_h$.

Figure 4:
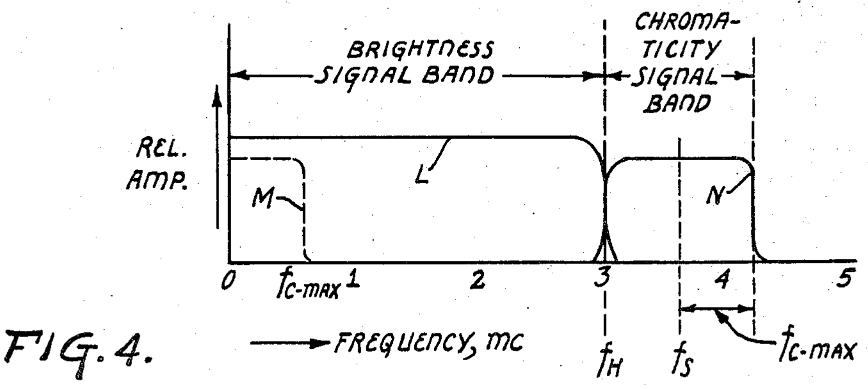
Figure 4 is a graphical representation illustrating certain frequency interrelationships existing in the embodiments of my invention repersented by Figures 1 and 2.

The frequency spectrum occupied by the brightness signal is represented in Figure 4, wherein the abscissae represent frequency in megacycles per second, and the ordinates are generally indicative of the relative amplitudes of the signal components compared to their amplitudes before frequency discriminatory action is applied thereto, and are therefore generally indicative of the frequency responses of the filters employed.

The response of filter 9 is represented by the solid line L, this response being substantially uniform from zero up to a frequency $f_h$, which may equal 3 mc., signal components having frequencies in excess of this value being substantially attenuated. It will be appreciated that the single filter 9 following adder 8 may be replaced by three separate filters having identical frequency characteristics and located in the paths by which the three separate color signals are supplied to adder 8.

The red, green and blue signals are also preferably supplied to low-pass filters 11, 12 and 13, having high-frequency cutoffs at frequencies $f_R$, $f_G$ and $f_B$, respectively. These high-frequency cutoffs may each be less than a maximum value $f_{c-max}$, and are preferably each equal to .6 mc. in a particular embodiment. The filtered color signals are then applied to input terminals 14, 15 and 16 of sampling device 18, which may be of the conventional type known in the art in which each of the three color signals are sampled in sequence by means of relatively narrow sampling pulses.

Thus sampler 18 may comprise three normally-cutoff pentagrid vacuum tubes having a common plate load impedance, each tube being supplied at one control grid thereof with one of the color signals. Each tube may then be supplied at another control grid thereof with positively-directed sampling pulses of relatively short duration compared to the period of the highest frequency component of the color signals, to render the tube conductive during the intervals of the pulses. These pulses may be derived from a common sampling oscillation having a frequency $f_s$, and are applied to the three tubes in phases which differ by 120°. In the present instance, the sampling frequency may conveniently be approximately 3.6 mc. These and other sampling circuit arrangements are well known in the art, and need not be further described here.

The composite signal from sampler 18 containing components due to the red, blue and green signals are then supplied to low-pass filter 19, having a high-frequency cutoff which may be situated above the sampling frequency $f_s$ by an amount $f_{c-max}$, and therefore at approximately 4.2 mc. in the specific case here exemplified. In accordance with the invention, the signal from sampler 18 is also limited with respect to its lower frequency components, which operation may be effected by supplying the signals from filter 19 to high-pass filter 20, which is operative to pass substantially only frequency components situated above the upper-frequency limit of the filtered color signals. Thus, filter 20 may have a low-frequency cutoff $f_{co}$ situated at, or slightly above, the frequency $f_{c-max}$. It will be appreciated that low-pass filter 19 and high-pass filter 20 may be combined into a single device comprising a bandpass filter having a lower frequency cutoff between $f_{c-max}$ and $(f_s-f_c\text{max})$, and a high frequency cutoff at $(f_s+f_c\text{max})$. For convenience in explanation only, two separate filters are shown in Figure 1.

Figure 3:
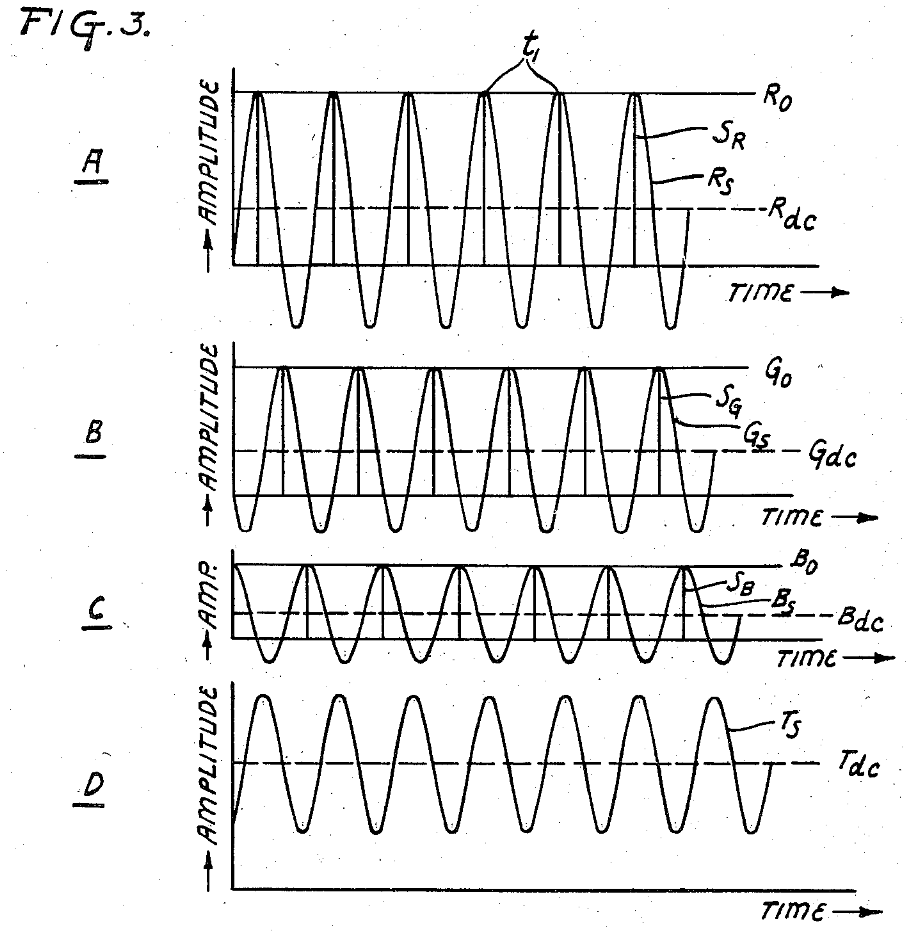
Figure 3 is a graphical representation illustrating the forms of certain signals produced in the arrangements represented in Figures 1 and 2.

Referring now to Figure 3, at A there are shown graphs of various signals produced in response to the original red color signal, in which graphs the ordinates represent signal magnitudes, while the abscissae represent time. These and other graphs of Figure 3 are illustrative only, and are not to be construed as quantitatively definitive of the magnitudes of the various signals represented therein. The solid, substantially horizontal line $R_O$ indicates a value which the original red signal from filter 11 may have in a predetermined time interval. This original red signal is sampled at times such as $t_1$ separated by time intervals equal to $1/f_s$ by means of narrow sampling pulses, to produce signal samples as indicated by the vertical lines such as $S_R$. It will be understood that these signal samples are of appreciable width, but for convenience in representation are indicated by single straight lines. When these signal samples have passed through low-pass filter 19, only frequency components situated near or below the sampling frequency $f_s$ remain in the signal. The signal at the output of low pass filter 19 due to the original red signal $R_O$ is therefore the signal $R_S$, which comprises a substantially sinusoidal component plus a low-frequency, or D. C., component $R_{dc}$ indicated by the substantially horizontal dashed line. This D. C. component is produced as a result of the existence of a D. C. component in the pulse signals effecting the sampling. The D. C. component $R_{dc}$ of the signal from filter 19 varies in fixed proportion to the original red signal $R_O$.

At B and C of Figure 3, there are shown similar graphs of the signals produced at the output of low-pass filter 19 in response to the green and blue original signals respectively. The solid, substantially-horizontal line $G_O$ represents the value of the green signal applied to sampler 18, the vertical lines such as $S_G$ represent the samples taken of this green signal by sampling device 18, and $G_S$ represents the signal produced at the output of low-pass filter 19 in response to the original green signal, and comprises a substantially sinusoidal portion plus a low-frequency or D. C. component $G_{dc}$ indicated by the substantially-horizontal dashed line. Similarly, at C of Figure 3, $B_O$, $S_B$, $B_S$ and $B_{dc}$ represent the original blue signal, the samples of the original blue signal produced by sampler 18, the signal produced at the output of low-pass filter 19 in response to the original blue signal, and the low-frequency or D. C. component of the latter signal, respectively.

At D of Figure 3, there is shown the composite signal waveform produced at the output of low pass filter 19 in response to all three of the original color signals. This signal, indicated $T_s$, comprises a total low-frequency or D. C. component $T_{dc}$ indicated by the substantially horizontal dashed line, and a higher-frequency sinusoidal portion, the D. C. component $T_{dc}$ is proportional to the sum of the individual D. C. components $R_{dc}$, $G_{dc}$ and $B_{dc}$, while the high-frequency sinusoidal component thereof equals the sum of the sinusoidal high-frequency components of the individual sampled signals $S_R$, $S_G$ and $S_B$. The phase of the signal $T_s$ therefore depends upon the relative amplitudes of the sinusoidal components of the individual color signals, and hence upon the hue of the image elements represented, while the amplitude of the sinusoidal component thereof depends upon the absolute magnitudes of the individual color signals and hence upon the saturation of the image elements represented.

The signal represented at D of Figure 3 is similar to that which is transmitted in certain systems of the prior art, and has a frequency spectrum, as indicated in Figure 4, comprising frequency components in a low-frequency range $(0-f_{c-max})$ shown by the dotted line M, as well as a high-frequency band of frequency components extending in either direction from the sampling frequency $f_s$ by an amount $f_{c-max}$, and represented by the solid line N. The low-frequency band of components in a range $(0-f_{c-max})$ contains all components representative of the low-frequency or D. C. component $T_{dc}$ of the composite signal from filter 19, while the higher-frequency band of components contains all those components comprising the substantially sinusoidal portion of the composite signal $T_s$ from filter 19.

In accordance with the present invention, the components of the composite signal from filter 19 lying in the low-frequency range (0 to $f_{c-max}$) are deleted by filter 20, thereby removing the D. C. component $T_{dc}$ of the composite sampled signal. The signal from filter 20 therefore comprises only the sinusoidal portion of the composite sampled signal $T_s$, which signal, at time-spaced intervals corresponding to those at which the original color signals were sample, has values indicative of the differences between these respective original color signals and the D. C. component $T_{dc}$.

However, to this sinusoidal component, which comprises a chromaticity signal having a phase representing the hue and an amplitude indicating the saturation of the color image, there is then added the brightness signal from low-pass filter 9. To accomplish this, the chromaticity signal from filter 20 is applied to signal adder 22, which is also supplied with the brightness signal from filter 9, adder 22 being operative to produce an output signal substantially proportional to the sum of the applied signals, by means of a conventional circuit arrangement which may be similar to that of adder 8.

It has been set forth hereinbefore that the D. C. component $T_{dc}$ of the composite signal from low-pass filter 19, which is deleted by filter 20, varies in proportion to the sum of the D. C. components of the individual sampled color signals, and therefore in proportion to the sum of the original color signals themselves. Similarly, the brightness signal from filter 9 varies in proportion to the sum of the original color signals, and therefore contains information of the same class as that contained in the deleted D. C. component. However, the brightness signal from filter 9 comprises frequency components extending from 0 to $f_h$, or from 0 to 3 mc. in a practical embodiment, as opposed to the deleted frequency components of the signal $T_{dc}$ which were limited to a band (0 to $f_{c-max}$) or (0—.6) mc. in the case exemplified herein. The output of adder 22 therefore comprises the chromaticity signal representative of chromaticity variations up to a frequency $f_{c-max}$, or .6 mc., plus a brightness signal or D. C. component representing brightness variations up to a frequency $f_h$, or 3 mc.

Accordingly, the operation of the portion of the color television transmitter thus far described is such as to produce a composite signal from low-pass filter 19 similar to that which is transmitted by certain systems of the prior art, but to delete therefrom the D. C. component thereof, representative of brightness variations, and to replace this D. C. component by a brightness signal occupying a larger frequency band. By means of this independent synthesis of the D. C. component or brightness portion of the composite signal, the fidelity with which brightness variations are reproduced may be made substantially greater than that with chromaticity variations are produced.

Due to the above-described selection of filter characteristics, the relation of the chromaticity signal band to the brightness signal band is that indicated in Figure 4, wherein it is seen that appreciable overlapping of the signal bands does not occur except for frequency components of each band which are of substantially attenuated magnitude. In this manner, substantial independence of the chromaticity signal band and the brightness signal band is obtained.

Although the arrangement for producing the amplitude-modulated chromaticity subcarrier here constitutes means for sampling each of three color signals in different phases, for adding together the three sampled signals, and for filtering the resultant signal to remove all components but the fundamental sampling frequency and its sidebands, it is to be understood that any of a variety of arrangements may be employed to perform an equivalent or identical function. The essential feature of the particular subcarrier-forming arrangement illustrated, in one aspect thereof, is the development of a fundamental signal frequency, i. e. the fundamental component of the sampling signal, the heterodyning of this fundamental component with each of the color-specifying signals in respectively different phases, the combination of the resulting signals to produce a composite signal, and the provision of means for discriminating against components of the original color-specifying signals in the latter composite signal as well as against signal components produced therein by harmonics of the fundamental component which are present in the pulse-type sampling signal. Accordingly, the desired operation may also be obtained by an arrangement in which only the fundamental component at the sampling frequency is generated and heterodyned with the color-specifying signals in different phases, whereby the low-pass filter 19 becomes unnecessary to remove higher harmonics and their sidebands. Further, balanced modulator arrangements known in the art may be employed which operate to prevent the occurrence of the original color-specifying signals in the composite subcarrier signal without requiring the use of highpass filter 20.

The composite image-representing signal from adder 22 is then supplied to a conventional sync injection circuit 23, wherein synchronizing signals from synchronizing signal source 24 are added to the image signals. Synchronizing signal source 24 may comprise conventional elements for generating the standard television deflection synchronizing signals, and may also include means for injecting a burst of the fundamental component of the sampling signal of frequency $f_s$ during the "back-porch" intervals of the synchronizing signals, which are the intervals of the horizontal blanking pulses immediately following the terminations of the horizontal synchronizing pulses. This latter operation may conveniently be performed by arranging a multigrid vacuum tube so that its plate is connected to an impedance across which the blanking signals are developed, and by supplying two respective control grids of the latter vacuum tube with the sampling oscillation of frequency $f_s$ and with gating pulses occurring during the "back-porch" intervals, the latter gating pulses being operative to render the vacuum tube conductive during the "back-porch" intervals and being suitably derived by appropriate delay circuits supplied with the horizontal synchronizing pulses, for example.

The composite television signal from sync injection circuit 23 may then be supplied to modulator 25, which is operative to control R. F. oscillator 26 in such manner as to produce therefrom an R. F. carrier having amplitude modulation corresponding to that of the video intelligence. The resultant modulated carrier-wave from R. F. oscillator 26 may then be supplied through vestigial sideband filter 27 to antenna 28 for radiation into space. The circuit arrangements by which the complete color television video signals from sync injection circuit 23 are caused to be transmitted upon the radio-frequency carrier may be entirely conventional in design, and need not be described here in detail.

Figure 2:
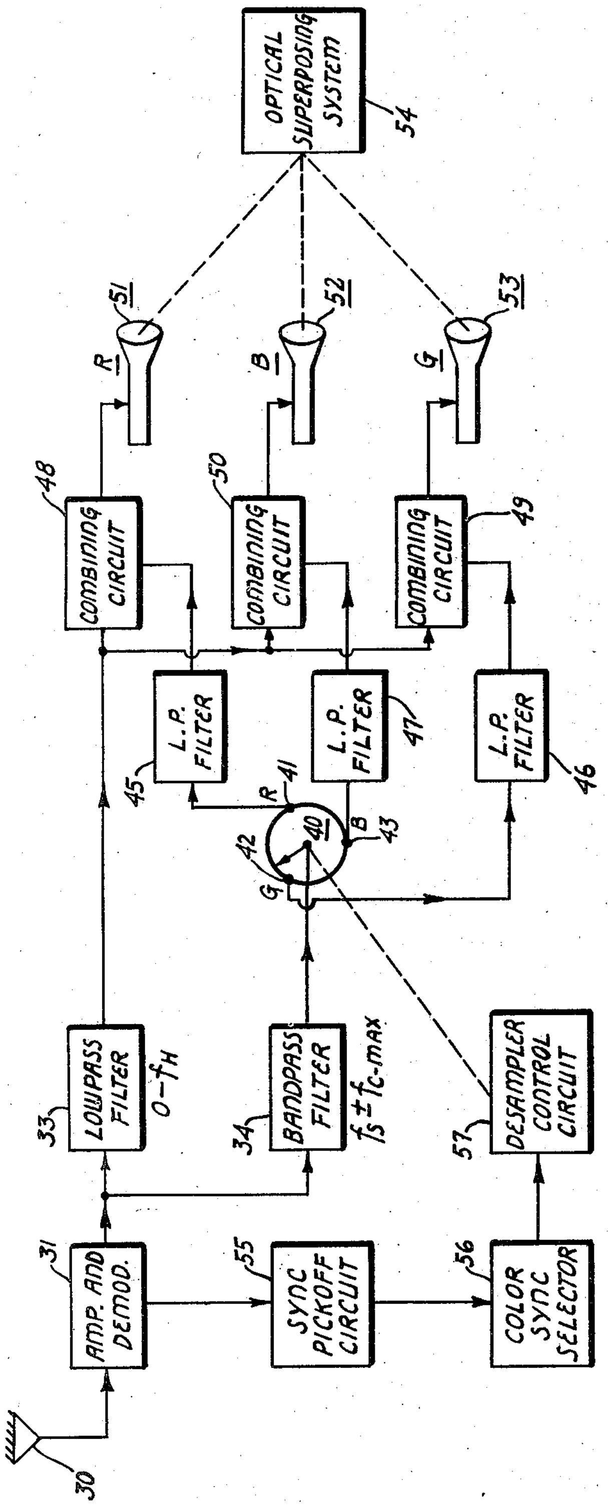
Figure 2 is a block diagram of a color television receiver constructed in accordance with one embodiment of my invention.

Referring now to Figure 2, the signal transmitted by transmitting antenna 28 may be received by receiving antenna 30 and supplied to amplifier and demodulator 31, wherein the original video modulation of the radio-frequency signal is recovered. Receiving antenna 30, and amplifier and demodulator 31, may each be substantially identical with their corresponding counter-parts in a standard monochrome television receiver, preferably having a bandwidth of at least 4.2 mc. in the present embodiment. The recovered video signal from amplifier and demodulator 31, comprising frequency components occupying the low-frequency range extending from 0 to $f_h$ and representing brightness variations, together with a higher-frequency portion containing frequency components extending substantially from $f_h$ to $(f_s+f_{c-max})$, is then applied to low-pass filter 33 and bandpass filter 34 in parallel.

Filter 33 may have a frequency passband extending from zero to substantially the frequency $f_h$, while bandpass filter 34 has a low-frequency cutoff at a frequency substantially equal to $f_h$ and a high frequency cutoff which may be equal to $(f_s+f_{c-max})$, but which may be situated at a higher frequency value if desired for reasons specific to a particular application. The signal from low-pass filter 33 then comprises the brightness signal components in substantially unattenuated form, together with only a small number of attenuated components of the chromaticity signal at the extreme high-frequency end of the brightness signal band. The output of bandpass filter 34, on the other hand, comprises substantially only the chromaticity signal components with but a small number of attenuated components of the brightness signal situated at the extreme lower limit of the lower sideband of the chromaticity signal.

The separated chromaticity signals from bandpass filter 34 are applied to the single input terminal of desampler 40. Desampler 40 is operative in effect to supply the chromaticity signal to each of three output terminals in succession, at times corresponding to those at which samples of the original color signals were taken in the transmitter. Thus, desampler 40 may comprise three normally cut-off, multigrid vacuum tubes having separate plate load circuits, each having one control grid thereof connected to the output terminal of filter 34 from which the chromaticity signals are supplied. Another control grid of each of these vacuum tubes may be supplied with a series of pulses recurrent at the same sampling frequency $f_s$ and in the same relative phase as was employed at the transmitter to sample a particular one of the original color signals. Such desampling devices are also well known in the art, and therefore do not require further description.

Accordingly, at output terminal 41 of sampler 40 there may be produced pulse samples having amplitudes proportional to the amounts by which the original filtered red signal from filter 11 at the transmitter differs from the sum of the D. C. components of the three original color signals. Similarly, at output terminals 42 and 43 of desampler 40, there may be produced series of pulse samples representative of the differences between the original filtered green and blue signals from transmitter filters 12 and 13 respectively, and the sum of the D. C. components of the original color signals. The separated red color-difference signal from terminal 41 is then supplied through low-pass filter 45 to combining circuit 48, the separated green color-difference from signal terminal 42 is supplied through low-pass filter 46 to combining circuit 49, while the separated blue color-difference signal from terminal 43 is supplied through low-pass filter 47 to combining circuit 50. Each of the filters 45, 46 and 47 may have passbands extending from zero to approximately the upper limit $f_{c-max}$ of the original color signals, e. g., .6 mc. When filters having this passband are employed, the three color-difference signals supplied to combining circuits 48, 49 and 50 will be substantially continuously representative of the differences between the original color signals at the transmitter and the sum of the D. C. components thereof.

The separated brightness signal from low-pass filter 33 is applied to all three of the combining circuits 48, 50 and 49, which supply the brightness signal to cathode-ray tubes 51, 52 and 55 respectively to control the intensities of the light emitted thereby. Tubes 51, 52 and 53 may contain image-displaying screen members each comprising phosphors emitting light of one of the red, blue and green primary colors with respect to which the original red, green and blue signals formed at the transmitter specify the image color. The three primary-color images formed upon the screens of the three cathode-ray tubes are then superposed optically by means of optical superposing system 54, which conventionally may comprise a pair of suitably-disposed dichroic mirrors, to produce a final resultant television image. Other image-displaying apparatus, employing but a single special cathode-ray tube for example, may alternatively be employed for this purpose.

In the present embodiment in which equal color signals represent shades of black and white, the brightness signals supplied through the combining circuits to the cathode-ray tubes are preferably equal, so as to produce variations only in the brightness of the final resultant image, with no substantial effect upon the chromaticity thereof. However, it is to be understood that each combining circuit may include means for controlling the magnitude of the brightness signal supplied thereto, so as to permit adjustment of the magnitude of the brightness variations produced in the final image. This control means may comprise variable-gain amplifiers or voltage dividers, which may be adjusted to produce any desired relation between the brightness variations and the chromaticity variations produced in the image by the signals from desampler 40.

The red, green and blue color-difference signals supplied to combining circuits 48, 49 and 50 are therein added to the brightness signals and supplied to cathode-ray tubes 51, 53 and 52 respectively to control the relative intensities of the light therefrom and hence the chromaticity of the resultant image. Means, may also be provided in the combining circuits for controlling the magnitudes of the chromaticity signals.

By appropriate adjustment of the magnitudes of the chromaticity signals and brightness signals to compensate for differences in the gains of the paths by which these two signals travel from within the transmitter to the receiver cathode-ray tubes, individual component color images formed in the three receiver cathode-ray tubes may be made such that, when superposed optically, the resultant image simulates closely the appearance of the original televised scene.

To insure operation of the receiver desampler device 40 at the proper frequency and phase, amplifier and demodulator 31 may supply received signals to sync pick-off circuit 55, which may be similar to the conventional amplitude-discriminatory devices employed for separating the synchronizing pulses in standard monochrome receivers, wherein appropriate care should of course be given to selecting that amplitude level which includes a substantial portion of the burst of sampling-frequency signal formed on the "back-porch" of the blanking pulses. The separated sync, comprising both the deflection synchronizing signals and the color-sampling frequency signals, may then be supplied to color sync separator 56, which may comprise a suitable filter responsive only to signals having frequencies substantially equal to that of the sampling frequency, whereby the sampling burst is selected. The separated carrier burst may then be supplied to desampler control circuit 57, wherein it may be utilized to control the frequency and phase of the sampling pulses employed in the desampler 40 to produce the required correspondence with the transmitter sampling device. This control is indicated generally in the figure by the dashed line. Control circuits suitable for this purpose may comprise means for controlling a local oscillator to produce a frequency which, on the average, is substantially equal to that of the received carrier burst, a controllable phase-shifting device to which the locally-generated oscillations are supplied, and a phase-comparing device supplied with the received carrier burst and with the locally-generated oscillations for producing a control voltage indicative of departures of the phase of the local oscillation from that of the carrier burst, which control voltage may be supplied to the controllable phase-shifting device to vary the phase of the locally-generated oscillation in such manner as to cause it to follow substantially instantaneously the phase variations of the received carrier burst. This phase and frequency controlled, locally-generated oscillation may then be utilized to control the timing of the sampling pulses utilized in the desampler 40. Such an arrangement is described in detail in the copending application Ser. No. 197,551 of J. C. Tellier, for Signal Control Circuits, filed November 25, 1950.

Due to the fact that the independent synthesis of the brightness signals and the chromaticity signals permits the generation of a wideband brightness signal and a narrowband chromaticity signal, these signal bands may be so situated as to be substantially mutually exclusive, as indicated in Figure 4, while representing image intelligence which is adequate to produce a satisfactory color image at the receiver, and while utilizing a relatively narrow frequency transmission band. Since the brightness and chromaticity signals are situated thus in substantially mutually-exclusive frequency bands, the brightness signal separated by low-pass filter 33 in the receiver of Figure 2 contains substantially only components of the brightness signal, while the signal separated by bandpass filter 34 and supplied to desampler 40 comprises substantially only components of the chromaticity signal. Accordingly, undesirable crosstalk between these two signals, and the production of spurious beat patterns which is occasioned by such crosstalk in certain systems of the prior art, is substantially completely obviated.

Although the brightness signal has been indicated in this instance as comprising the sum of equal proportions of the red, green and blue color signals, linear sums of other than equal proportions of these individual color signals may, in some instances, be utilized as a brightness signal, so as to produce any desired degree of panchromaticity in the brightness signal. When this is done, the relative proportions of the chromaticity signals should also be adjusted accordingly, so as to produce the desired red, green and blue signals at the three receiver cathode-ray tubes.

Further, the low-pass filters 45, 46 and 47 in the receiver of Figure 2 may in some instances have frequency passbands extending from zero to an upper frequency limit situated between the sampling frequency $f_s$ and the lower limit of the lower sideband of the second harmonic of the sampling frequency. If this is done, the separate color signals supplied to the combining networks in the receiver will comprise variations having peak values representative of the desired color signals. As a result, the final superposed color image formed at the receiver may then contain a dot structure or pattern due to the periodic increases in intensity of the beam produced by the periodically-varying chromaticity signals as the image is scanned. In this instance, it is preferable that the sampling frequency $f_s$ be selected in such manner that the dots produced during one scanning of the image lie intermediate those produced during the succeeding image scanning. Such operation may conveniently be effected by selecting a sampling frequency $f_s$ which is an integral odd multiple of one-half the horizontal line-scanning frequency employed in the television cameras at the transmitter. Such a frequency is also preferred in the previously discussed case in which filters 45, 46 and 47 have passbands extending only from 0 to $f_{c-max}$, to improve the compatibility of this color television system with respect to standard monochrome television receivers.

Thus, if the transmission of the transmitter of Figure 1, represented by the solid lines of Figure 4, is received by a standard monochrome receiver, the brightness signal extending from 0 to 3 mc. will produce substantially the same effects in forming a television image in the standard receiver as would a 0 to 3 megacycle signal generated by a monochrome television transmitter. The chromaticity signal, however, which comprises principally components situated intermediate harmonics of the line-scanning rate due to the selection of the sampling frequency at an odd integral multiple of one-half the horizontal line-scanning rate, is such as to be in opposite phases at corresponding points in successive television frames, and the effects which it produces upon the image intensity are therefore opposite during successive frames and tend to cancel due to the integrating action of the phosphor of the cathode-ray tube and the persistence of vision of the human eye. Because the transmitter of the present invention produces a band of brightness signals which are substantially free of interfering signal components, further deletion of the effects of the chromaticity signal may be obtained by including in the monochrome receiver a low-pass filter having a high-frequency cutoff at substantially 3 megacycles, which filter may be switched into the video channel of the receiver when color transmissions are to be received, thereby preventing the chromaticity signal from producing any effects whatsoever upon the monochrome image.

Although the present invention has been described with relation to particular embodiments thereof, it will be understood that it is subject to wide diversification in the structure and arrangement employed in particular applications, without departing from the spirit of the invention. For example, the arrangement by means of which the amplitude-modulated subcarrier comprising the chromaticity signal is formed at the transmitter need not be a conventional sampler employing sampling pulses having D. C. components, followed by frequency-selective means for deleting the low-frequency portion thereof corresponding to the original color signals. Instead, one may delete these low-frequency components by subtracting from the sampled signal at the output terminal of filter 19, a signal proportional to the sum of the color signals from filters 11, 12 and 13. Similar cancellation of these low frequency components may be accomplished by employing conventional balanced-modulator circuits in which the desired amplitude-modulation of the chromaticity signal subcarrier is accomplished without producing the undesired low-frequency signals corresponding to the original color signals. Further, it is possible to form a suitable chromaticity signal by subtracting from each color signal, a signal which is a predetermined proportion of the sum of the individual color signals, and by then sampling the resultant difference signals in the manner described hereinbefore in detail. The proportion of the sum signal thus subtracted from each color signal should then be such that the sum of the resulting difference signals is zero. In the embodiment of the invention described hereinbefore, this may be accomplished by subtracting from each of the color signals one-third of their total. The color-difference signals thus formed are then each zero when representing white. If such color-difference signals are applied to a balanced modulator arrangement to produce the chromaticity signal, no subcarrier signal is produced when reproducing shades of black and white, which is obviously often a practical advantage. Appropriate care should then be taken in adjusting the gain-determining devices in the receiver combining circuits so that the magnitude of the brightness signal added to each color-difference signal is equal to that subtracted from the corresponding original color signal at the transmitter, so as to recover the original color signals at the receiver cathode-ray tubes. Similar variations in the arrangement of the receiver desampler, and various modifications of the channel through which the brightness signal passes, may readily be employed by those practicing the invention, without departing from the spirit thereof.

I claim:

1. A color television system, comprising: means for producing a brightness signal representative of variations in the brightnesses of successively-scanned regions of a televised scene; modulation means for producing at the output terminals thereof a modulated subcarrier signal representative of the chromaticity of said regions and having values, during predetermined, successive time-spaced intervals, indicative respectively of differences between said brightnesses and the intensities required of a plurality of predetermined color primaries in order to match the colors of said regions, the lower sideband of said subcarrier signal having a bandwidth differing substantially from the bandwidth of said brightness signal; first frequency-selective means for limiting said brightness signal to a frequency band substantially exclusive of that occupied by said subcarrier signal; means for transmitting said band-limited brightness and subcarrier signals to a receiver; second frequency-selective means at said receiver responsive to said transmitted signals to separate said brightness signal from said subcarrier signal; a color-image reproducing device comprising a plurality of sources of light of respectively different chromaticities, said device being responsive to signals supplied thereto to vary the intensities of said colored-light sources, thereby to vary the color of the combined light emission of said sources; and means responsive to said separated brightness signal and to said separated subcarrier signal for varying the intensities of said colored-light sources in such manner that the color of said combined light emission therefrom substantially matches that of corresponding scanned regions of said televised scene.

2. The system of claim 1, in which said means for deriving a modulated subcarrier signal comprises a circuit arrangement for sampling in sequence a plurality of said original color-specifying signals other than said brightness signal to produce a composite signal, and means for deleting from said composite signal components thereof having frequencies at least as low as those contained in said original color-specifying signals.

3. The system of claim 2, in which said means for deleting said low-frequency components comprises a filter having a low-frequency cutoff situated above the highest frequency of any component of substantial magnitude in said original color-specifying signals.

4. A color television transmission system, comprising: an image-reproducing device including a plurality of sources of light of respectively different chromaticities, said device being controllable in response to a plurality of color-specifying signals to vary the intensities of said colored-light sources and hence to vary the color of the combined light from said sources; a camera arrangement for producing a plurality of original color-specifying signals, one of said last-named signals being representative of the brightness of light from a televised object; means responsive to said color-specifying signals for generating a subcarrier signal having a phase indicative of the hue and an amplitude indicative of the saturation of said televised object; means for transmitting said subcarrier signal and said brightness-representing signal in substantially mutually-exclusive frequency bands; frequency-selective means responsive to said transmitted signals to separate said brightness-representing signal from said modulated subcarrier signal representing hue and saturation; means responsive to said separated brightness-representing signals to vary the intensities of each of said sources in the same sense, thereby to control the brightness of said combined light from said sources; and means responsive to said separated subcarrier signal to vary the relative intensities of said colored-light sources, thereby to control the hue and saturation of said combined light.

5. Apparatus for translating a color image from a first location to a second location, said apparatus comprising: means for scanning said color image at said first location to produce three color-specifying signals; means for deriving from said color-specifying signals a first signal representative of the brightnesses of successively-scanned elements of said color image; means for limiting said brightness-representing signal to frequency components occupying a band having a predetermined upper limit $f_h$; means for deriving from said color-specifying signals a phase- and amplitude-modulated subcarrier signal having a phase indicative of the hue of said image elements, an amplitude indicative of the saturation of said image elements, and a fundamental frequency external to said band of brightness-representing signals; means for substantially completely eliminating from said subcarrier signal all frequency components thereof situated within said band of brightness-representing signal frequencies; means for transmitting said brightness-representing signal and said subcarrier signal to a receiver at said second location; means for separating said brightness-representing signal and said subcarrier signal substantially completely at said receiver; means for producing at said receiver a light emission of controllable color; means for utilizing said separated brightness-representing signal to control the brightness of said light emission; and means for utilizing said separated subcarrier signal to control the chromaticity of said light emission.

6. Apparatus for translating a color image from a first location to a second location, said apparatus comprising: means for scanning said color image to derive three color-specifying signals respectively indicative of the amounts of three primary colors required to match the colors of successively-scanned elements of said image; means for combining portions of said signals to produce a brightness signal whose variations are substantially proportional to variations in the apparent brightness of said image; means for limiting said brightness signal to a relatively wide frequency band having an upper limit $f_h$; means for selecting portions of said color-specifying signals containing frequency components lying within a relatively narrow low-frequency band having an upper limit $f_{c-max}$; means for sampling said band-limited color-specifying signals at said first location in succession and at a predetermined rate to produce a composite signal comprising a low frequency portion and higher frequency portions; means for rejecting from said composite signal substantially all components having frequencies differing from said sampling rate by an amount at least as great as the highest frequency $f_{c-max}$ of said color-specifying signals, to produce a narrow-band subcarrier signal; means for replacing said rejected frequency components of frequency less than said sampling rate with said brightness signal to produce a resultant color-image representing signal; means for transmitting said image-representing signal to a receiver; means for separating said transmitted signals at said receiver into two portions according to their frequencies, said lower-frequency wide-band brightness signal being separated into a first signal channel and said narrow-band subcarrier signal being separated into a second and separate signal channel; means for sampling said subcarrier signal in said second channel at the same rate and in the same relative phase as said color-specifying signals are sampled at said first location, signal samples thus produced at each phase position being supplied to respectively different output terminals; means for generating a plurality of light emissions of respectively different chromaticities and controllable intensities; means for combining said light emissions to form a resultant image of controllable color; means for varying the intensities of each of said light emissions in the same sense in response to said separated brightness signals to vary the brightness of said resultant color image; and means for varying the intensities of each of said light emissions in different directions in response to samples of said subcarrier signal produced at respectively different ones of said output terminals to control the chromaticity of said resultant color image.

7. In a color television receiver for reproducing the appearance of a televised image in response to signal transmissions comprising a first band of frequency components representative of image brightness and a second band of frequency components representative of image chromaticity, said second band of frequency components comprising a subcarrier signal modulated in accordance with intelligence as to said image chromaticity and said first and second frequency bands being substantially mutually exclusive, the combination which comprises: image-reproducing means including a plurality of sources of light of different chromaticities, said image-reproducing means being responsive to signals varying in accordance with the brightness of said televised image and signals varying in accordance with the chromaticity of said televised image to form therein a reproduced version of said televised image; frequency-selective means supplied with said transmissions for separating said first band of frequency-components from said second band of frequency components; demodulation means supplied with said separated second band of frequency components for deriving therefrom signals varying in accordance with the chromaticity of said televised image; means for supplying said demodulated signal to said image-reproducing means; and means shunting said demodulation means for supplying said separated first band of frequency components to said image-reproducing means to control the brightness of said reproduced image.

References Cited in the file of this patent

UNITED STATES PATENTS

| | | |
|---|---|---|
| 2,554,693 | Bedford | May 29, 1951 |
| 2,580,685 | Mathes | Jan. 1, 1952 |
| 2,580,903 | Evans | Jan. 1, 1952 |
| 2,677,721 | Bedford | May 4, 1954 |
| 2,773,929 | Loughlin | Dec. 11, 1956 |

OTHER REFERENCES

"A Six Megacycle Compatible . . . Television System" and "Analysis of Sampling Principles," Television, vol. VI, pages 270–337, published by RCA Review (1949–1950). (Copy in Div. 16.)